US008015115B2

(12) United States Patent
Brennan et al.

(10) Patent No.: US 8,015,115 B2
(45) Date of Patent: Sep. 6, 2011

(54) SYSTEM AND METHOD FOR PROVIDING CONTROLLED ACCESS TO A FUNDS DISPENSING DEVICE FROM EXTERNAL PROCESSORS

(75) Inventors: Steven J. Brennan, Farmington, CT (US); Hafeesmon Chettiparambil, Derby, CT (US); Sambasivam Thillaikumaran, Southbury, CT (US); Brian C. Hannigan, Southington, CT (US)

(73) Assignee: Pitney Bowes Inc., Stamford, CT (US)

( * ) Notice: Subject to any disclaimer, the term of this patent is extended or adjusted under 35 U.S.C. 154(b) by 762 days.

(21) Appl. No.: 11/965,339

(22) Filed: Dec. 27, 2007

(65) Prior Publication Data

US 2009/0172126 A1 Jul. 2, 2009

(51) Int. Cl.
*G06F 17/00* (2006.01)

(52) U.S. Cl. ........................................................ 705/60

(58) Field of Classification Search .................. 705/401, 705/402, 410

See application file for complete search history.

(56) References Cited

U.S. PATENT DOCUMENTS

| | | | | |
|---|---|---|---|---|
| 6,151,590 | A * | 11/2000 | Cordery et al. | 705/60 |
| 6,157,919 | A | 12/2000 | Cordery et al. | |
| 6,865,557 | B1 * | 3/2005 | Cordery et al. | 705/60 |
| 7,076,736 | B2 * | 7/2006 | Hugh | 715/743 |
| 7,490,089 | B1 * | 2/2009 | Georgiev | 1/1 |
| 2002/0077991 | A1 | 6/2002 | Heimann et al. | |
| 2002/0143713 | A1 * | 10/2002 | Stutz | 705/401 |
| 2003/0117434 | A1 * | 6/2003 | Hugh | 345/744 |
| 2007/0136216 | A1 * | 6/2007 | Simcik et al. | 705/410 |

FOREIGN PATENT DOCUMENTS

| | | | |
|---|---|---|---|
| EP | 0927959 | A2 | 7/1999 |
| EP | 1739628 | A2 | 1/2007 |

OTHER PUBLICATIONS

"High-tech features help streamline mail process. (new mail handling equipment)", Francis Damon, Purchasing, v129, n7, p. 127 Oct. 19, 2000.*

* cited by examiner

*Primary Examiner* — Rutao Wu

(74) *Attorney, Agent, or Firm* — George M. Macdonald; Charles R. Malandra, Jr.; Steven J. Shapiro

(57) ABSTRACT

Systems and methods for providing controlled access to value dispensing devices are described and in certain examples, systems including those for providing controlled access to a postage meter from multiple programs executing on an external collocated processor are described.

17 Claims, 4 Drawing Sheets

SYSTEM AND METHOD FOR PROVIDING CONTROLLED ACCESS TO A FUNDS DISPENSING DEVICE FROM EXTERNAL PROCESSORS

FIELD OF THE INVENTION

The illustrative embodiments described in the present application are useful in systems including those for providing controlled access to value dispensing devices and more particularly are useful in systems including those for providing controlled access to a postage meter from multiple programs executing on an external collocated processor.

BACKGROUND

Value storage and dispensing devices including postage meters have been in use including the DM SERIES mailing machines including postage meters available from PITNEY BOWES INC. of Stamford, Conn. Such devices typically do not provide user access from a collocated processor through multiple programs.

The MAILSTATION mailing machine is an example of a mailing machine including a postage meter that is available from PITNEY BOWES INC. of Stamford Conn. The MAILSTATION system includes a multi-line display and a keypad for providing user access for configuring and using the mailing machine. Additionally, the MAILSTATION mailing machine includes an analog modem communications subsystem that is useful for communicating with a remote data center to process transactions such as postage refill operations.

SUMMARY

The present application describes illustrative embodiments of systems and methods for providing controlled access to value dispensing devices and in certain illustrative embodiments describes systems and methods for providing controlled access to a postage meter from multiple programs executing on an external collocated processor.

In one illustrative example, a collocated processor configured with a proxy server program arbitrates access to a mailing machine through a communications channel by managing exclusive access requests to the mailing machine.

In another illustrative embodiment, a mailing machine manages exclusive access requests by locking out an embedded user interface while servicing exclusive access requests from a collocated processor.

In yet another illustrative example, a collocated processor configured with a proxy server program retrieves authentication data from a remote data center in order to determine whether a requesting PC application is authorized to access the mailing machine.

BRIEF DESCRIPTION OF THE DRAWINGS

The accompanying drawings illustrate several alternative embodiments of the invention, and together with the general description given above and the detailed description given below, serve to explain the principles of the invention. As shown throughout the drawings, like reference numerals designate like or corresponding parts.

DETAILED DESCRIPTION

Figure 1:
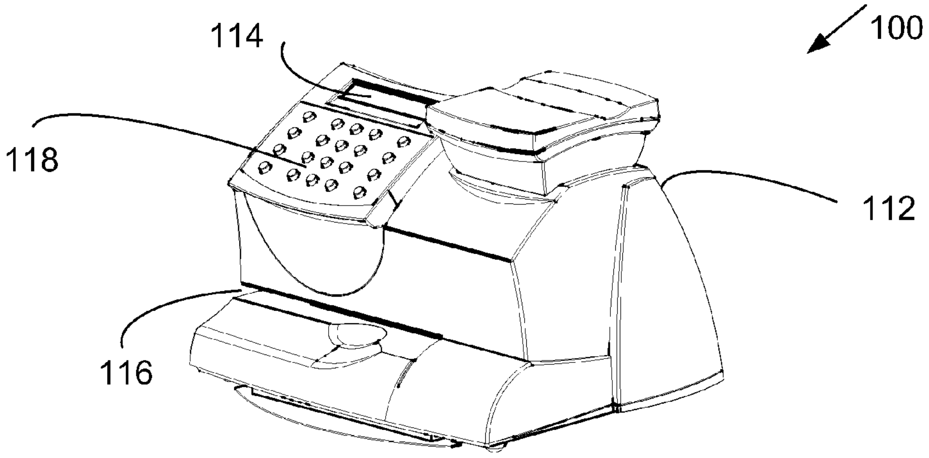
FIG. 1 is a perspective view of a mailing machine according to an illustrative embodiment of the present application.

The illustrative embodiments of the present application describe systems and methods including those that are useful for providing controlled access to value dispensing devices. In certain illustrative embodiments, the application describes systems and methods for providing controlled access to a postage meter from multiple programs executing on an external collocated processor.

The illustrative embodiments described here are described as modifications to the MAILSTATION mailing machine available from Pitney Bowes Inc. of Stamford, Conn. Such mailing machines incorporate a postage meter. The modified mailing machine described herein may receive operating input from several different controlling sources. It may receive operator input through the traditional integrated keypad and display user interface. It may also receive operating input data from a collocated processor such as a PC configured to run a control program designed specifically to use as an interface to the mailing machine.

Moreover, the mailing machine may receive operating input from one or more types of multi-purpose software such as third-party shipping solution software running on the collocated processor. One possible multi-purpose third-party program that could be configured to interface with illustrative embodiments described herein includes the modified SHIPPING ASSISTANT available from the United States Postal Service (USPS).

In at least some embodiments, the collocated processor is configured to execute a specific purpose program designed to manage access to the mailing machine from the multi-purpose software running on the collocated processor. In at least some of the embodiments, only one input source may control the mailing machine at a particular time. Accordingly, systems and methods for controlling access to the mailing machine are described to ensure that control contention issues do not arise. If more than one source were permitted access without appropriate safeguards, user confusion and/or inappropriate meter actions might occur.

In at least some of the embodiments, a common special purpose Proxy program is installed on a collocated processor. All of the multi-purpose PC Software Applications must be designed to communicate through the common Proxy program using its Application Program Interface (API) calls. The Proxy program then communicates using a communications interface and protocol such as the Universal Serial Bus (USB) interface to the mailing machine.

The Proxy program may be a portion of a MAILSTATION ASSISTANT special purpose program (a dedicated external user interface, PC APP #2) designed to interface with the MAILSTATION mailing machine. The special purpose assistant program includes an API that permits other PC Software Applications to interact with the assistant program and therefore the mailing machine operatively connected to the assistant software. The Proxy program is configured to act as the arbitrator in granting access to the mailing machine from the multi-purpose PC applications.

When the Proxy program is successful in obtaining such exclusive access for a PC Software Application, the mailing machine and postage meter is captured for exclusive use by that requesting PC Software Application. In at least some embodiments, once exclusive use is granted, the meter keypad and display in order are locked by the meter to prevent the meter from being operated using the embedded keypad and display.

Certain illustrative embodiments described herein may be used to provide multiple access arbitration to a mailing machine without requiring extensive redesign of components of a traditional mailing machine such as the internal user interface and operating programs. As described herein, a mailing machine and associated postage meter may maintain a state that is consistent with user intentions, thus avoiding user confusion and possible wasted postage. Furthermore, the described Proxy Server software and interface specification may be restricted to approved vendors for creation of compatible third-party PC Applications.

Referring to FIG. 1, a perspective view of a mailing machine 100 according to an illustrative embodiment of the present application is shown. The mailing machine 100 includes an embedded user interface that includes a display 114 and a keypad 118. The mailing machine includes a printer input section 116 for receiving articles to be printed such as envelopes. The mailing machine includes a USB communications connection 112 on its back panel. The mailing machine 100 may include a physically secure coprocessor such as an IBUTTON cryptographic processor device, available from Dallas Semiconductor of Dallas, Tex., to provide end-to-end security with a Data Center including authentication, non-repudiation and secure encrypted communication.

Figure 2:
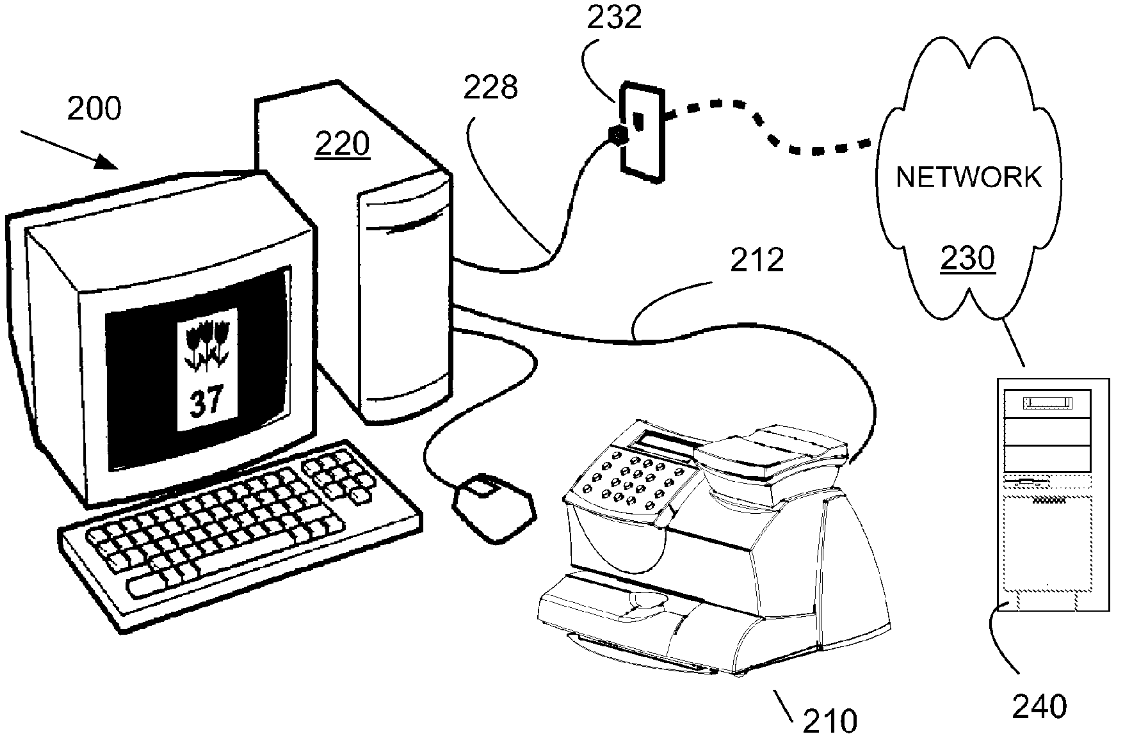
FIG. 2 is a schematic diagram of a postage dispensing system according to an illustrative embodiment of the present application.

Referring to FIG. 2, a schematic diagram of a postage dispensing system 200 according to an illustrative embodiment of the present application is shown. A mailing machine 210 is connected to a collocated processor such as PC 220 using a communications link 212 such as a USB connection. Collocated processor 220 is connected to a network 230 such as the Internet using a networking connection 228 such as an Ethernet connection. The communication link 212 comprises an ETHERNET connection to the Internet, but could alternatively utilize a telephone connection via a Public Switched Telephone Network (PSTN) or a local network connection via a Local Area Network (LAN). Furthermore, the mailing machine 210 may include an ETHERNET connection and an analog modem. Accordingly, collocated processor 220 is connected through the Network 230 to the remote Data Center 240 through network connection 232.

Data Center 240 includes a suitable processing system having a computing device such as a server computer and one or more memory components for data storage. The Data Center 240 may include server computers such as those available from DELL Corp. The collocated processor comprises an x86-based desktop PC computer such as those available from DELL Corp. including a WINDOWS operating system such as the WINDOWS XP operating system available from MICROSOFT. The collocated processor includes a CPU, a mass storage device such as a hard drive and working memory such as RAM memory.

Figure 3:
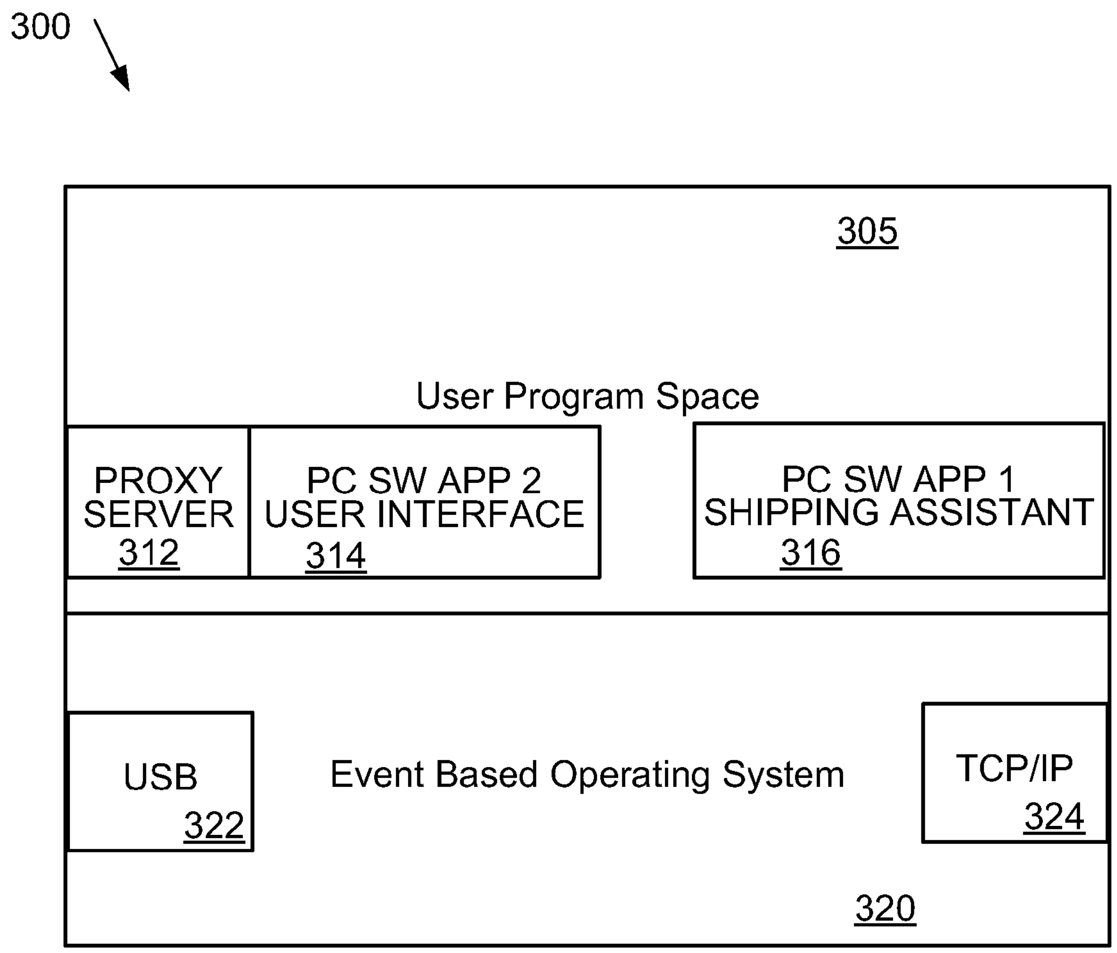
FIG. 3 is a schematic diagram of a processor memory configuration according to an illustrative embodiment of the present application.

Referring to FIG. 3, a schematic diagram of a processor memory configuration 300 of collocated processor 220 according to an illustrative embodiment of the present application is shown. The operating system executing in 320 comprises MICROSOFT WINDOWS XP, however other operating systems such as LINUX may be utilized. The operating system 320 includes a USB interface driver 322 and a TCP/IP protocol stack 324. The user program space 305 includes many applications, three of which are depicted. The Proxy server 312 and PC SW App2 (User Interface) may be combined into one MAILSTATION ASSISTANT application program. This application comprises a special purpose program designed to operate with a mailing machine type or group of mailing machine types. Proxy server 312 communicates with mailing machine 210 through the USB communications interface driver 322.

The Proxy Server may also communicate through network 230 with the data center 240 using the TCP/IP protocol stack 324. PC SW App 2 includes the special purpose user interface program designed to operate with mailing machine 210. PC SW App 1 is a representative multi-purpose software application program that is not necessarily dedicated to interfacing with the mailing machine such as the USPS modified SHIPPING ASSISTANT program. As an alternative, the third-party software application may also be a single purpose program dedicated to interfacing with the mailing machine. Furthermore, additional PC SW Applications may be executing in user space 305 and enabled to request exclusive access to mailing machine 210.

Figure 4:
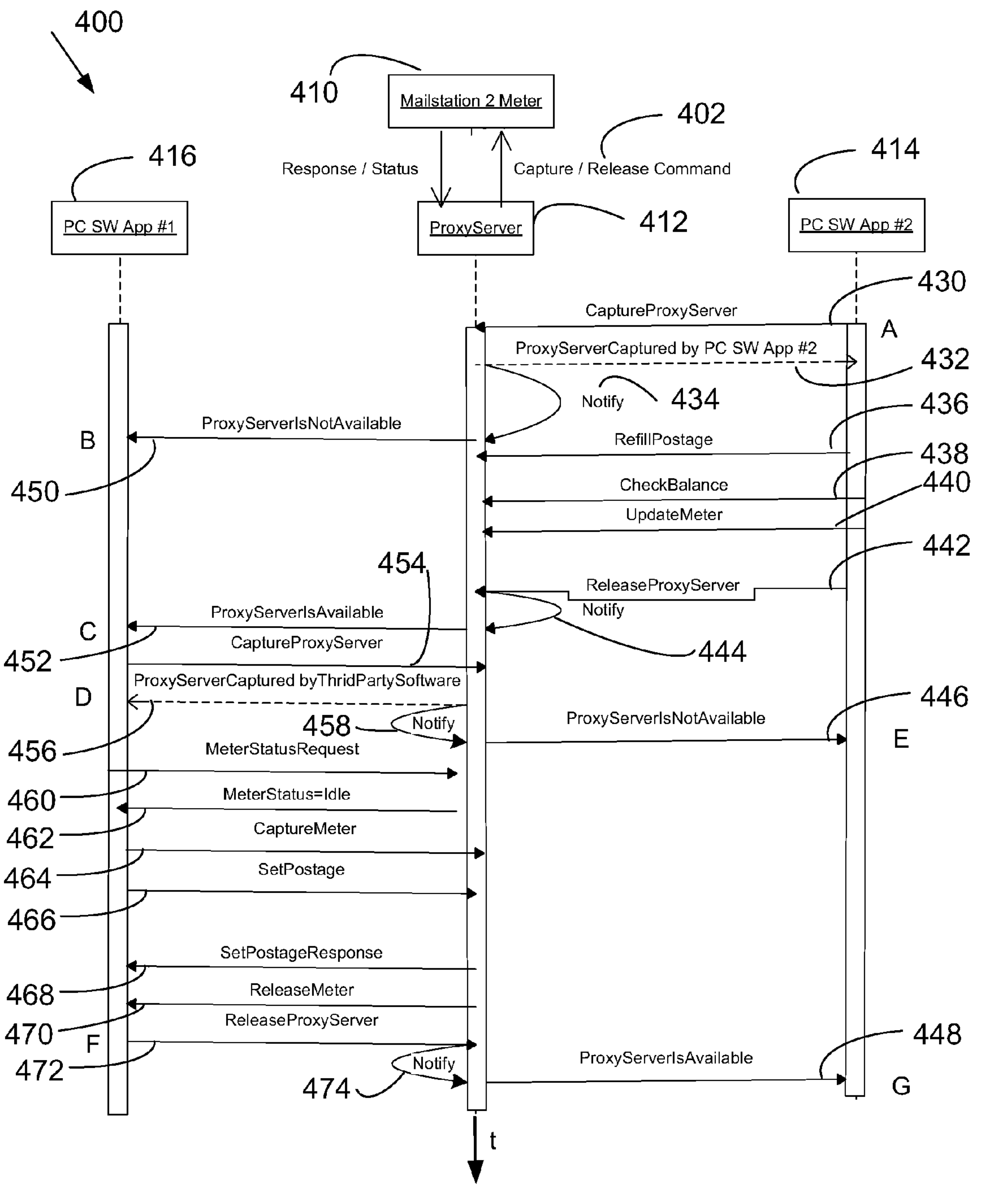
FIG. 4 is a schematic diagram including a message sequence diagram according to an illustrative embodiment of the present application.

Referring to FIG. 4, a schematic diagram including a message sequence diagram 400 along timeline t according to an illustrative embodiment of the present application is shown. The mailing machine 410 communicates with Proxy Server 412 using a USB channel 402 to send Capture/Release Commands and Response/Status messages. PC SW App 1 416 represents a multi-purpose software program such as a modified USPS SHIPPING ASSISTANT program executing in the context of a logged in and authenticated user on a collocated processor. PC SW App 2 414 represents the MAILSTATION ASSISTANT User Interface program. As described below, the User Interface program may be used to complete meter functions that previously were performed using the embedded user interface such as refilling the postage vault.

Additionally, the MAILSTATION ASSISTANT application may be used to read mailing machine status and obtain information such as error conditions, postage balance and postage meter state. The MAILSTATION ASSISTANT may also utilize its connection to the remote Data Center in order to update the mailing machine embedded software, update postal rate tables and add custom advertising slogan images as appropriate. Furthermore, the modified SHIPPING ASSISTANT application or other non-dedicated application may read postage meter status, read the mailing machine scale weight, zero the scale and set the postage value. Alternatively, the MAILSTATION ASSISTANT may also be configured to perform those functions. Accordingly, the sample messages in the illustrative message sequence diagram 400 are not limited to the messages shown, but could include messages related to all of the interface functions possible with the multiple programs executing on the external collocated processor.

When message 430 is sent to the Proxy Server 412 to request exclusive access through a CaptureProxyServer message, the Proxy server acts. The Proxy server denies the request if another program currently has exclusive access. If available, the Proxy server sends a Capture command to the mailing machine 410 across channel 402. If the mailing machine is available, it accepts the capture command. Then the Proxy server 412 sends a ProxyServerCaptured message 432 to PC SW App 2 and broadcasts a notify message 434 to the operating system. Thus at about time A, PC SW App 2 is the Active User of the Proxy Server and is provided exclusive access to the mailing machine in order to perform various operations.

PC SW App 2 then sends a RefillPostage message 436 to initiate a postage refill, followed by a CheckBalance message 438 in order to check the balance of the postage meter. PC SW App 2 then sends an UpdateMeter message 440 to update the postage meter and then releases the exclusive access by sending a ReleaseProxyserver message 442. The Proxy server 412 receives that message and sends a Release command to the mailing machine using channel 402. The Proxy Server 412 also broadcasts a notify message 444 to the operating system to inform the other programs that the Proxy server has been released.

PC SW App 1 416 is registered to receive the broadcast Notify 434 event such that message 450 ProxyServerisNotAvailable is sent to it. Thus, at about time B, PC SW App 1 is informed that the Proxy server is not available. PC SW App 1 416 is registered to receive the broadcast Notify 444 event such that message 452 ProxyServerisAvailable is sent to it. Thus, at about time C, PC SW App 1 is informed that the Proxy server is available. If the Proxy server receives an exclusive access request while another program has exclusive access to the mailing machine, the Proxy server is configured to reject the later request and provide a status message.

Since the Proxy server is available, PC SW App 1 will be able to successfully request exclusive access (so long as the embedded user interface is not being utilized). Therefore, message 454 CaptureProxyServer is sent. Since the Proxy server is available, a capture command is sent to the mailing machine. If accepted, the Proxy Server sends message 456 ProxyServerCapturedbyThirdPartySoftware and to provide exclusive access and also sends a broadcast notify message 458.

Thus, at about time D, PC SW App 1 is the Active User of the Proxy server and can now exclusively access the Proxy Server. The PC SW App 1 can then pass through a CaptureMeter command to obtain exclusive access to the mailing machine if the embedded user interface is not being used. If the Proxy server receives an exclusive access request while another program has exclusive access to the mailing machine, the Proxy Server is configured to reject the later request and provide a status message. PC SW App 2 414 is registered to receive the broadcast Notify 458 event such that message 446 ProxyServerisNotAvailable is sent to it. Thus, at about time E, PC SW App 2 is informed that the Proxy Server is not available.

Message 460 MeterStatusRequest is sent through the Proxy server and a Response provides a MeterStatus=Idle message 464 to indicate the meter is idle. Since the postage meter is idle, exclusive access will likely be granted when requested. Accordingly, when message 464 CaptureMeter is sent, the meter is configured for exclusive access by PC SW App 1. Accordingly, when message 466 SetPostage is sent, the meter then franks an envelope or meter tape when inserted with the amount of postage set by the message. The mailing machine provides a SetPostageResponse message 468 to provide postage meter status. Message 470 Release Meter is sent through the Proxy Server to inform the mailing machine postage meter to release exclusive control.

Thereafter, message 472 ReleaseProxyServer is sent to release the Proxy Server for access by other programs on the collocated processor. Thus, at about time F, PC SW App 1 has release exclusive access to the Proxy server and notice message 474 is broadcast. PC SW App 2 414 is registered to receive the broadcast Notify 474 event such that message 448 ProxyServerisAvailable is sent to it. Thus at about time G, PC SW App 2 is informed that the Proxy server is available.

Figure 5:
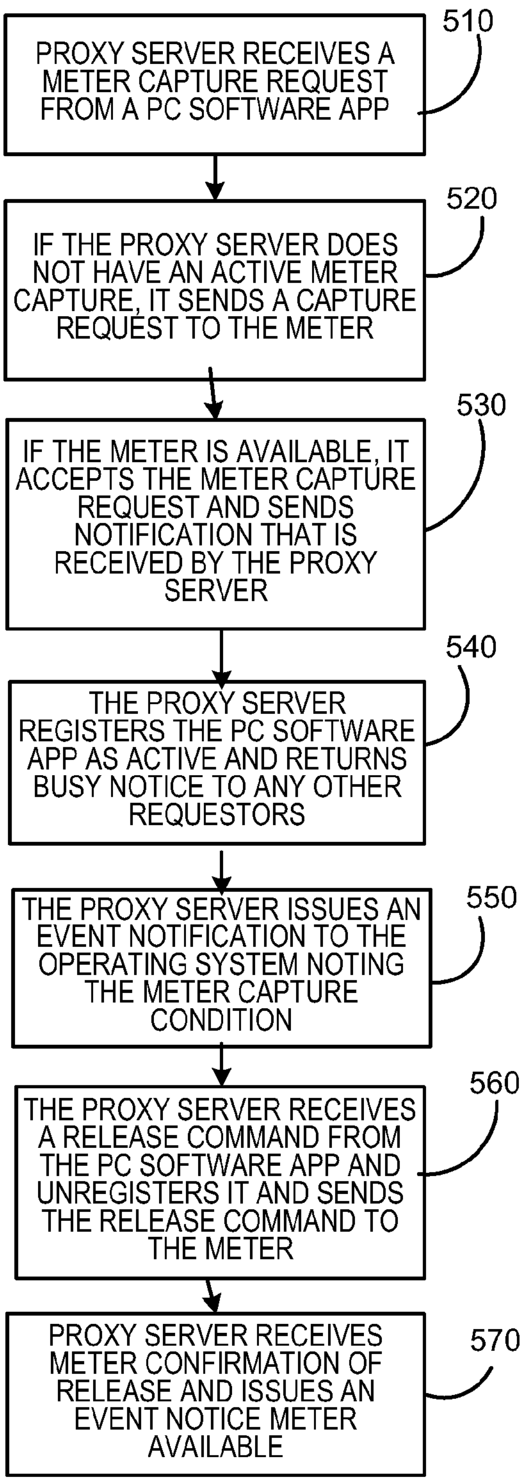
FIG. 5 is a flowchart of a representative method for providing controlled access to a postage meter according to an illustrative embodiment of the present application.

Referring to FIG. 5, a flowchart of a representative method for providing controlled access to a postage meter according to an illustrative embodiment of the present application is shown. In step 510, the Proxy server receives a meter capture request from a PC software application.

In an alternative, the Proxy server provides two levels of exclusivity. First, the Proxy server may be captured such that only one of the PC SW programs has access. Then, during a subset of time when the Proxy Server is captured, the mailing machine may be captured such that the embedded user interface is also locked out. Accordingly, the Proxy Server may be captured by the modified SHIPPING ASSISTANT application and yet still allow operation of the embedded user interface until the mailing machine is captured. Therefore, the modified SHIPPING ASSISTANT program may capture the meter only when needed so that the user may still utilize the mailing machine using the embedded user interface when the mailing machine is not locked by the modified SHIPPING ASSISTANT application.

In step 520, if the Proxy server does not have an Active Meter Capture, it sends a Capture Request to the mailing machine and postage meter. In step 530, if the mailing machine is available, it accepts the meter capture request and sends an associated notification that is received by the Proxy Server. In step 540, the Proxy server registers the PC Software App as the Active User and returns a BUSY notice to any other requesters. In step 550, the Proxy server issues an event notification to the operating system noting the meter capture condition. Each of the relevant programs configured to utilize the proxy server will have been registered to receive such event notifications from the operating system.

In step 560, the Proxy Server receives a Release Command from the PC SW App and unregisters the PC SW App as the Active User. The Proxy Server sends the Release Command to the mailing machine/postage meter. In step 570, the Proxy server receives confirmation of the release from the mailing machine and issues an event notice to indicate that the mailing machine/postage meter is available.

Figure 6:
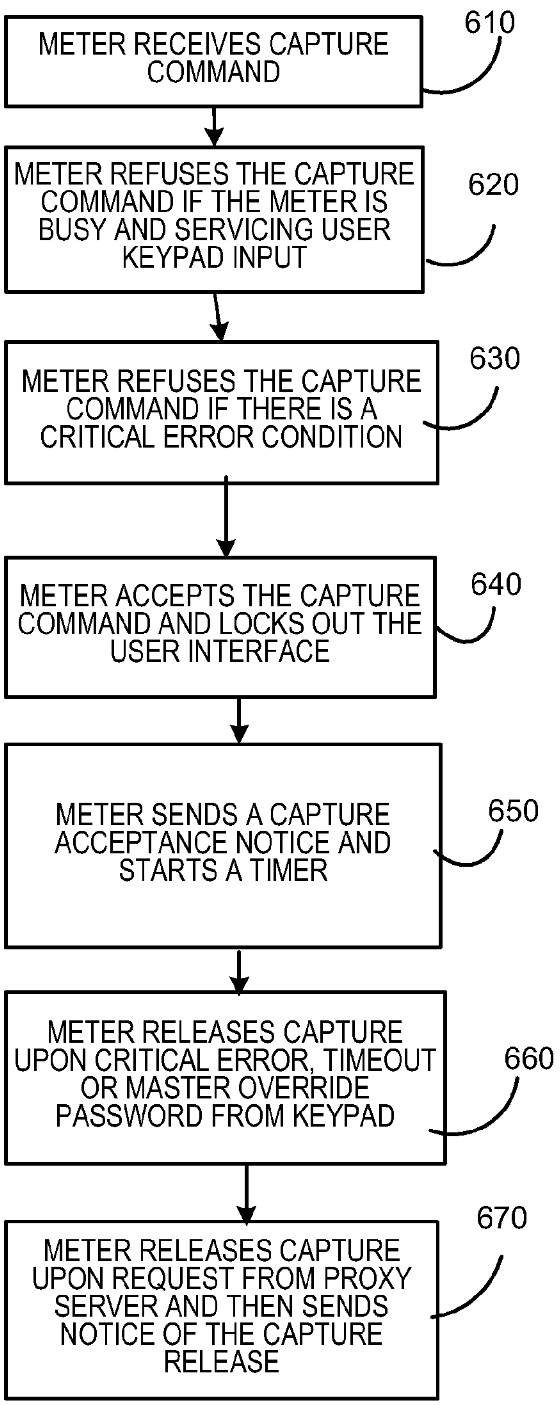
FIG. 6 is a flowchart of a representative method for a postage meter to provide controlled access from an external processor according to an illustrative embodiment of the present application.

Referring to FIG. 6, a flowchart of a representative method for a postage meter to provide controlled access from an external processor according to an illustrative embodiment of the present application is shown. In step 610, the mailing machine/postage meter (meter) receives a Capture command. In step 620, the meter refuses the capture command if the meter is busy and servicing user keypad input from the embedded user interface. If not busy, the process continues. In step 630, the meter also refuses the capture command if the meter is experiencing a critical error condition. If there is no critical error, the process continues.

Otherwise, in step 640, the meter accepts the capture command and locks out the embedded user interface. For example, the display may provide a message stating that the meter is under PC control. Alternatively, the meter may also provide a message stating the embedded user interface control may be regained using a master password or the like.

In step 650, the meter sends a capture acceptance notice and starts a timer. In step 660, the meter releases the capture condition if it suffers a critical error, a timeout of the timer or a master override from the embedded user interface keypad. In step 670, the meter releases the capture condition upon a request from the Proxy server and then sends a notice of the capture release and the meter process ends and returns control to the traditional meter control.

In a Meter Capture process, the Proxy accepts a Capture command from a PC Software Application and registers the PC Software Application as the Active User of the meter. Next, the Proxy prevents other PC Software Applications from accessing the meter based on the existence of a registered Active User. The Proxy returns a 'busy' state to any requesting applications and also notifies any running application that an Active User has been granted access to the meter.

Once a registered user is identified, the Proxy acts to Capture the meter for the exclusive use of the requesting application by sending a Capture command to the meter via the USB Driver/USB port. The meter receives the Capture command and returns a response indicating whether the Capture was a success or not. Once the meter accepts the Capture command it locks its keypad and display to prevent local user interaction.

In a Meter Release process, The Proxy accepts a meter Release command from PC Software Application and unregisters the PC Software Application as the Active User. Next, the Proxy sends a Release command to the meter. This puts the meter in a state in which it can be used standalone using the local keypad and display.

The Meter prevents Capture and returns its current status under certain critical error conditions. The Meter also prevents user keypad interaction when Captured except under critical error conditions. If a critical error condition occurs while Captured, the meter exits its Capture mode and annunciates an error to the registered Active User. The Meter releases itself and goes to sleep after a timeout period such as 10 minutes if no Release command is ever received. This prevents the meter from remaining Captured should the registered Active User go off-line unexpectedly.

The PC software programs described herein are written in "C++" using the MICROSOFT VISUAL STUDIO development environment and the .NET framework. However, other appropriate languages and development environments may be utilized.

In an alternative applicable to any of the illustrative embodiments herein, the Proxy Server 312 may communicate with the data center 240 using the TCP/IP stack 324 to obtain valid signatures for authorized PC SW APPs. The digital signatures may be used to authenticate any of the PC SW APPs before providing user interface access to the mailing machine 210.

In an alternative applicable to any of the illustrative embodiments herein, the mailing machine 210 may be configured to allow an operator to override the lockout condition upon correct entry of a system or configurable password. The system may be configured to allow a certain transition period before passing control back to the embedded user interface. Additionally, the mailing machine 210 may be configured to send an event through USB to the collocated processor to disconnect the proxy server.

In an alternative applicable to any of the illustrative embodiments herein, the mailing machine 210 may be configured to allow read access by the external collocated processor to certain data such as the current scale reading without requiring lockout of the postage meter embedded interface.

In another alternative applicable to any of the illustrative embodiments herein, the collocated processor 220 also includes a physically secure cryptographic processor such as an IBUTTON used to authenticate the processor 220 to the mailing machine 210. The multi-purpose software applications may be authenticated in several ways. Initially, a public key cryptographic authentication process may be used for a challenge/response authentication. The proxy server software may also be utilized to check for a valid cryptographic digital signature of the executing version of the multi-purpose software application. A table of signatures may be stored in the collocated processor proxy server application or may be stored in a physically secure cryptographic coprocessor connected to the collocated processor 220. Similarly, each message on the USB bus between the mailing machine and the collocated processor may be cryptographically secured and/or authenticated.

In yet another alternative applicable to any of the illustrative embodiments herein, the collocated processor 220 executes an "open" PC postage application that utilizes the PSD vault of the collocated mailing machine. Illustrative "virtual meter" systems are referred to and described in commonly-owned U.S. Pat. No. 6,619,544 B2, entitled System And Method For Instant Online Postage Metering, issued Sep. 16, 2003 to Bator, et al. and incorporated herein by reference. As an alternative here, the systems and methods referred to and described therein are modified such that the collocated processor 220 is configured to produce "open" indicium using the PCIBI-O specification available from the USPS, but by using the meter license and funds stored in the PSD of the collocated mailing machine 210.

Co-pending, commonly-owned U.S. patent application Ser. No. 11/645,980 entitled "Simultaneous Voice and Data Systems for Secure Catalog Orders," filed Dec. 27, 2006 by Jeffrey D. Pierce, et al., describes systems for simultaneous voice and data systems and is incorporated herein by reference. In yet another alternative applicable to any of the illustrative embodiments herein, the systems and methods described therein may be utilized with the systems and methods described here.

While illustrative embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

We claim:

1. A proxy server system using an external collocated processor for providing controlled access to a postage meter from multiple programs executing on the external collocated processor comprising:

the external collocated processor executing an operating system, the multiple programs including a multi-purpose software application and executing the proxy server, the external collocated processor including memory and instructions configured to perform the following when executing the proxy server:

receiving a proxy server capture request from a multi-purpose software application running on the external collocated processor;

if the proxy server is not currently captured, accepting the capture request and if the proxy server is currently captured, providing an error notification;

if the proxy server capture request is accepted, setting the multi-purpose software application as an active user entitled to exclusive access to the proxy server;

broadcasting an event notice to the operating system executing on the external collocated processor;

receiving a postage meter capture request;

sending the postage meter capture request to the postage meter;

receiving a capture request notice from the postage meter; and sending an associated notice to the multi-purpose software application.

2. The proxy server system of claim 1, further comprising:

the external collocated processor including memory and instructions configured to perform the following:

receiving a postage meter release request;

sending the postage meter release request to the postage meter; and sending an associated notice to the multi-purpose software application.

3. The proxy server system of claim 2, further comprising:

the external collocated processor including memory and instructions configured to perform the following:

receiving a proxy server release request;

processing a proxy server release command; and broadcasting a proxy server available event notice to the operating system executing on the external collocated processor.

4. The proxy server system of claim 1, further comprising:

the external collocated processor including memory and instructions configured to perform the following:

authenticating the multi-purpose software application.

5. The proxy server system of claim 1, further comprising:

a dedicated communications channel operatively connecting the external collocated processor to the mailing machine.

6. The proxy server system of claim 5, wherein:

the dedicated communications channel comprises a Universal Serial Bus (USB) port.

7. The proxy server system of claim 1, further comprising:

the external collocated processor including memory and instructions configured to perform the following:

receiving control messages received from the multi-purpose software application;

sending the control messages received from the multi-purpose software application to the postage meter;

receiving response messages received from the postage meter; and processing response messages received from the postage meter.

8. The proxy server system of claim 1, further comprising:

the external collocated processor including memory and instructions configured to perform the following:

authenticating the collocated processor.

9. The proxy server system of claim 4, further comprising:

the external collocated processor including memory and instructions configured to perform the following:

authenticating the multi-purpose software application by communicating with a remote data center to obtain at least one validation signature associated with the multi-purpose software application.

10. The proxy server system of claim 4, further comprising:

the external collocated processor including memory and instructions configured to perform the following:

authenticating the multi-purpose software application by using at least one validation signature stored in the proxy server system.

11. The proxy server system of claim 4, further comprising:

the external collocated processor including memory and instructions configured to perform the following:

authenticating the multi-purpose software application by using at least one validation signature stored in a secure cryptographic coprocessor included in the postage meter.

12. A mailing machine having an embedded processor and an embedded user interface, wherein the mailing machine is configured to allow user interface access from an external collocated processor executing a proxy server and at least one multi-purpose software application, the mailing machine comprising:

the embedded processor including memory and instructions configured to perform the following:

receiving a postage meter capture request from a proxy server;

determining if the embedded user interface is active;

if the embedded user interface is active, returning a busy message; and if the embedded user interface is not active, processing the meter capture to lock-out the embedded user interface and transfer exclusive control of the mailing machine to the proxy server.

13. The mailing machine of claim 12, further comprising:

the embedded processor including memory and instructions configured to perform the following:

authenticating the proxy server.

14. The mailing machine of claim 12, further comprising:

the embedded processor including memory and instructions configured to perform the following:

displaying a lock-out override prompt using the embedded user interface.

15. The mailing machine of claim 12, further comprising:

the embedded processor including memory and instructions configured to perform the following:

polling for error conditions and releasing the lock-out condition if a critical error is detected.

16. The mailing machine of claim 12, further comprising:

the embedded processor including memory and instructions configured to perform the following:

starting a timer upon lock-out of the embedded user interface, and releasing the lock-out condition if a timeout of the timer occurs.

17. The mailing machine of claim 12, further comprising:

the embedded processor including memory and instructions configured to perform the following:

using a secure cryptographic coprocessor to provide a secure end-to-end communication channel through the proxy server to a remote data center.

* * * * *